United States Patent
Raukola et al.

[11] Patent Number: 5,955,014
[45] Date of Patent: Sep. 21, 1999

[54] PROCEDURE FOR THE MANUFACTURE OF A FOAMED PLASTIC PRODUCT

[75] Inventors: Jaako Raukola, Tampere; Kari Kirjavainen, Espoo; Hannu Minkkinen, Lansi-Teisko, all of Finland

[73] Assignee: VTT Technology OY, Espoo, Finland

[21] Appl. No.: 08/793,357

[22] PCT Filed: Aug. 16, 1995

[86] PCT No.: PCT/FI95/00433

§ 371 Date: Apr. 21, 1997

§ 102(e) Date: Apr. 21, 1997

[87] PCT Pub. No.: WO96/06718

PCT Pub. Date: Mar. 7, 1996

[30] Foreign Application Priority Data

Aug. 29, 1994 [FI] Finland ................................ 943957

[51] Int. Cl.⁶ .................................................. B29C 44/02
[52] U.S. Cl. ........................... 264/50; 264/102; 264/321
[58] Field of Search ............................. 264/50, 321, 102, 264/288.4, 288.8, 290.2

[56] References Cited

U.S. PATENT DOCUMENTS

| | | | |
|---|---|---|---|
| 3,214,234 | 10/1965 | Bottomley | 264/50 |
| 3,883,625 | 5/1975 | Thomas et al. | 264/321 |
| 4,435,453 | 3/1984 | Vieth et al. | 264/50 |
| 4,438,053 | 3/1984 | Banke et al. | 264/50 |
| 4,473,665 | 9/1984 | Martini-Vvedensky et al. | |
| 4,761,256 | 8/1988 | Hardenbrook et al. | |
| 5,223,545 | 6/1993 | Kumar. | |
| 5,334,356 | 8/1994 | Baldwin et al. | |
| 5,358,675 | 10/1994 | Campbell et al. | |

FOREIGN PATENT DOCUMENTS

| | | |
|---|---|---|
| 88/05379 | 7/1988 | WIPO. |
| 92/17533 | 10/1992 | WIPO. |
| 94/16876 | 8/1994 | WIPO. |

*Primary Examiner*—Allan R. Kuhns
*Attorney, Agent, or Firm*—Helfgott & Karas, P.C.

[57] ABSTRACT

A process for fabricating a foamed plastic product. The process includes a plastic film that is prefoamed in order to introduce lamellar discontinuities such as prefoamed bubbles. The film is pressurized by a gas under a positive pressure causing the gas to diffuse into the film, forming a second film. Further, the second film is inflated in order to form the foamed plastic product. The second film is inflated by heating the second film at a temperature below the melting point of the second film and under a reduced pressure.

8 Claims, 2 Drawing Sheets

PROCEDURE FOR THE MANUFACTURE OF A FOAMED PLASTIC PRODUCT

BACKGROUND OF THE INVENTION

1. Field of the Invention

The present invention relates to a procedure for the manufacture of a foamed plastic product.

2. Description of the Related Art

Foamed plastic films and blanks can be manufactured primarily by using foaming agents added directly into the film production process or by orientation stretching at a suitable temperature of a film structure containing special additives. With normal extrusion foaming methods, foaming degrees exceeding 50% are seldom achieved.

SUMMARY

E.g. U.S. Pat. No. 4,473,665 presents methods for pressurizing solid plastic with gas to achieve foaming. However, these methods require pressures of several tens, even hundreds of MPa.

The object of the present invention is to produce a procedure for pressure inflation of a prefoamed plastic film that makes it possible to manufacture strongly foamed film products, involving a high foaming degree and allowing the thickness of the product to be increased without increasing the amount of plastic material.

In the procedure of the invention, a polymer to be inflated contains a structural boundary layer or micropore in which a bubble is nucleated and which is inflated during a pressurizing processs. The details of the features characteristic of the procedure of the invention are presented in the attached claims.

Films inflated by the pressurizing method are visually more dull and have an increased opacity and untransparency as compared with uninflated products. In practice, the change in the visual characteristics of the film improves its properties relating to printability. The films have more paper-like rigidity characteristics, and the product is more elastic and has a better (thermal, optical) insulating capability than an uninflated film.

By the pressurizing method, using biaxially oriented polypropylene films prefoamed to 30%, it is possible to produce homogeneous foamed films and sheets with an 80-% foaming degree. Since the inflation of the foam bubbles occurs at a temperature lower than the melting point of the polymer, the bubble walls of the structure are oriented simultaneously. The orientation increases the structural strength of the final product.

The pressure required in the procedure of the invention is of the order of only 1 MPa and accordingly the pressurization chambers needed are structurally light, thus making the procedure economical.

BRIEF DESCRIPTION OF THE DRAWINGS

In the following, the invention is described in detail by the aid of an example by referring to the attached drawing, in which.

DETAILED DESCRIPTION

Figure 1:
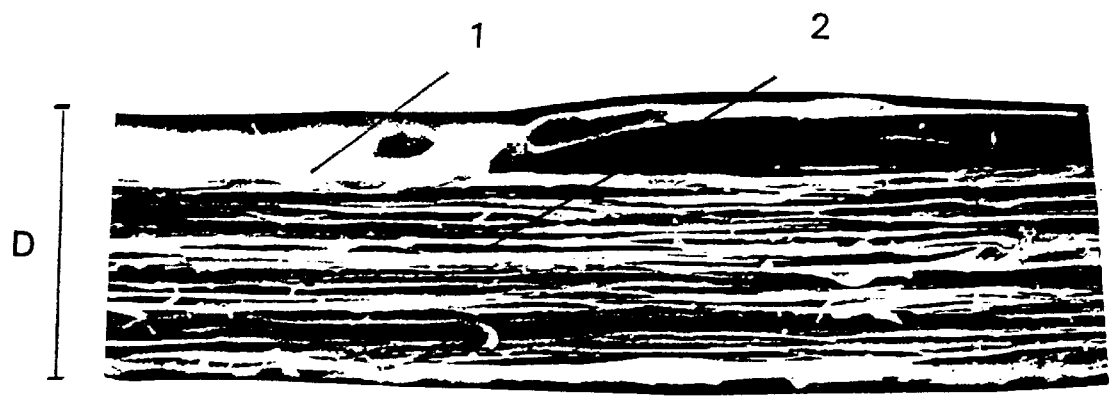
FIG. 1 presents an uninflated film (prefabricated product)

The basic film/blank 1 presented by FIG. 1 contains discontinuities 2 which may consist of prefoamed bubbles or boundary layers/spaces (boundary layer in a lamellar structure) formed by solid particles where a gas can be diffused and stored.

The basic film/blank 1 may have a thickness of the order of D=5 $\mu$m–1000 $\mu$m. The basic film/blank 1 may be in an unoriented state or in a biaxially oriented state. In this context, orientation refers to a method of processing of the plastic film/blank whereby the product is melted and then precooled to a temperature below the crystallization point and heated again to the orientation temperature for the time required by the stretching. The orientation temperature is lower than the melting point of the polymer.

The foamed structure in the basic film/blank 1 may be a lenslike structure produced by adding foaming agents into the process. It may also be a "shredded" or cavitated foamed structure resulting from internal shredding of the structure during orientation stretching, caused by solid additives or particles added into the polymer.

Figure 2B:
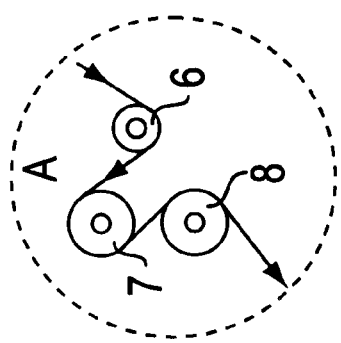
Figure 2C:
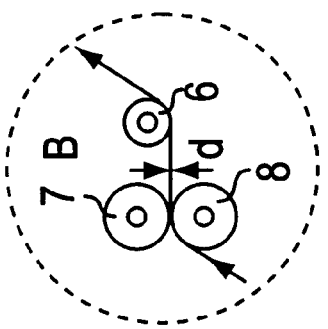
Figure 2A:
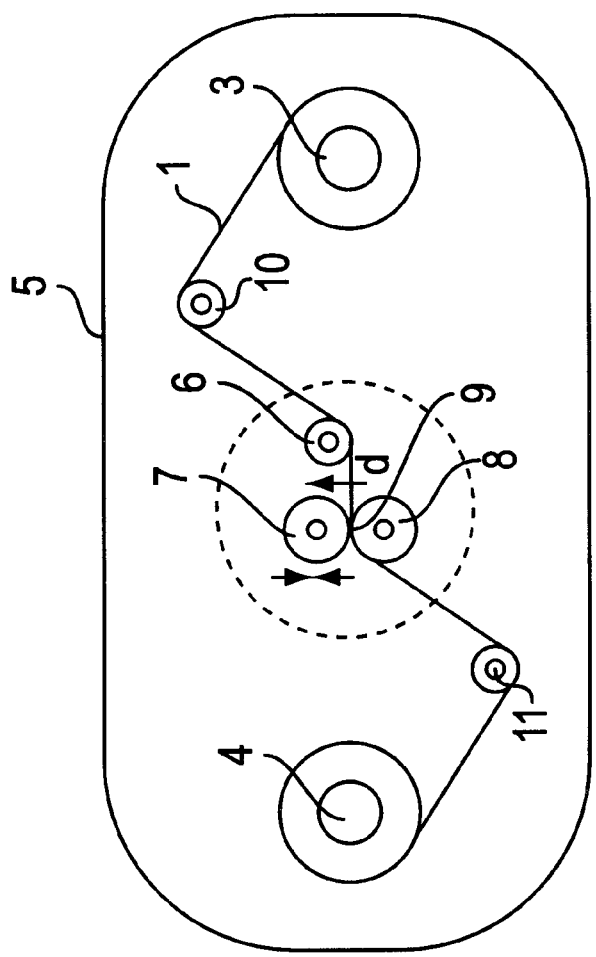

FIG. 2 presents an apparatus comprising an unwinding roller 3 and an end roller 4 for a film web 1, placed in a chamber 5. On the unwinding roller's side of the chamber 5 (on the right in FIG. 2a) there is also a guide roller 6 and after that two rollers 7,8 placed one upon the other, the upper one 7 of these rollers being movable in the vertical direction (as indicated by the vertical double-headed arrow) by means of a drive mechanism in such a way that, when roller 7 is in its low position, the gap between the rollers 7,8 forms a nip 9 as shown in FIG. 2a. The film has a thickness of D.

During gas treatment A as illustrated by FIG. 2a, the upper roller 7 is in its high position, leaving a large gap between the two rollers 7,8 placed one over the other. The foamed film/blank 1 is placed in the chamber 5, which can be pressurized. For pressurization, nitrogen, air or other gas can be used. In the chamber 5, the films 1 can be handled as a weblike product, the product 1 being wound from the unwinding roller 3 to the end roller so that it runs from the unwinding roller 3 obliquely upwards to an upper guide roller 10 placed at a higher level and further to guide roller 6. From here, the film 1 is passed around the upper roller 7 onto the lower roller 8, after which the film runs obliquely downwards to a lower guide roller 11 below and further to the end roller 4 as indicated by the arrows in FIG. 2b.

In the pressurized space 5, the internal boundary layers in the film/blank 1 are filled with gas. The amount of gas diffused into the film 1 and the rate of diffusion can be increased by heating the film 1 inside the chamber 5, lowering the rolling speed, increasing the pressure or by increasing the free-run distance travelled by the film 1 by passing it over auxiliary rollers. Auxiliary rollers and heating also improve the homogeneity of the diffusion process. Cooling the film 1 before its wound onto the end roller retards the diffusion of the gas from the film material 1.

After the winding in the chamber 5 under positive pressure, the chamber is depressurized and the finished roll is inflated (B, FIG. 2c). It is subjected to a new heat treatment, during which it is heated over the distance between the unwinding and end rollers. In FIG. 2c, the film is wound in the opposite direction as compared with FIG. 2b, as indicated by the arrows. The heating of the film 1 can be effected by using radiated heat or, to achieve a better thickness control of the end product, in the nip 9 between two heat rollers 7,8. The heat treatment performed after the film has been wound under positive pressure results in a permanent inflation of the product. The film 1 can also be inflated temporarily without heating, but such inflation will not be permanent because, due to the elastic properties of the polymer, the product is flattened to its original state after the gas has diffused away from the structure. Inflation effected between heating rollers 7,8 results in a very uniform thickness profile of the film/blank 1.

The thickness and the degree of inflation of the final product and can be adjusted by adjusting the nip distance and the distance travelled by the film on the heating rollers 7, 8. The inflation is performed at a temperature below the melting point of the polymer.

To reduce the costs, the same equipment can be used to wind the film under positive pressure and to wind it for inflation. The inflation efficiency can be further enhanced by creating a negative pressure in the chamber 5.

Figure 3:
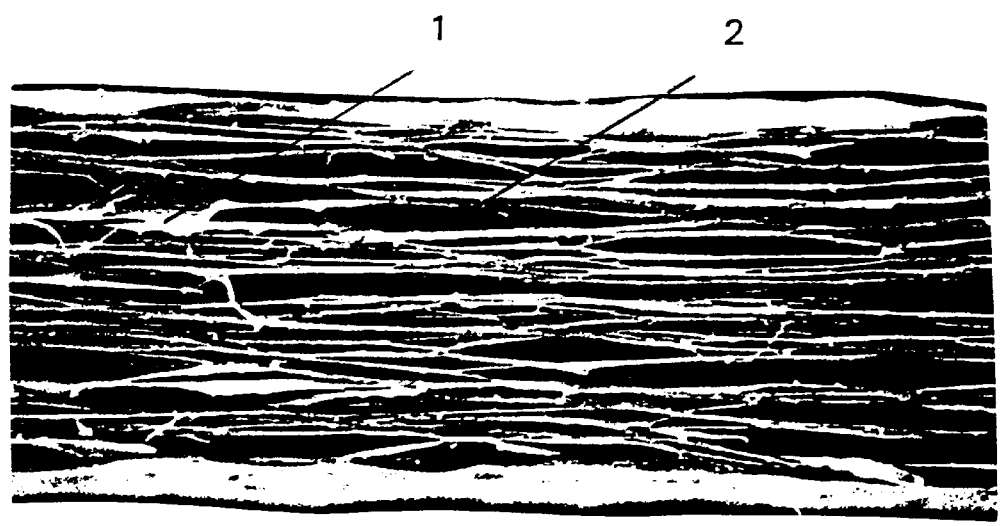
FIGS. 2a–2c illustrate the manufacture of foamed plastic films by the method of the invention and FIG. 3 presents an inflated film.

FIG. 3 illustrates a final product 1 as provided by the invention, in which the lamellar boundary layers 2 have been inflated to form lamellar gas gaps, making the product extremely elastic in its thicknesswise direction.

It is obvious to a person skilled in the art that different embodiments of the invention are not restricted to the example described above, but that they may instead be varied within the scope of the following claims.

We claim:

1. A process for manufacturing a foamed plastic film, comprising the steps of:
   pressurizing a preformed plastic film with a gas under a positive pressure causing the gas to diffuse into the film to form a pressurized plastic film;
   wherein the pressurized plastic film has a lamellar lens-like or cavitated structure with lamellar structural boundary layers;
   inflating the pressurized plastic film by heating the film at a temperature below a melting point of the film and under a reduced pressure, thereby forming an inflated foamed plastic film having a predetermined foaming degree and allowing a thickness of the film to be increased without increasing the amount of plastic material.

2. The process as defined in claim 1, wherein the positive pressure is approximately 1 Mpa.

3. The process as defined in claim 1, which further includes winding the film from a first roller to a second roller.

4. The process as defined in claim 1, wherein the inflation of the film is performed by heatable rollers while the film is being wound in an opposite direction, from a second roller to a first roller.

5. The process as defined in claim 1, which further includes prefoaming the film by using foaming agents or solid particles added into the manufacturing process, creating lamellar discontinuities in the film, wherein the discontinuities include prefoamed bubbles or gaps resulting from shredding.

6. The process as defined in claim 1, wherein the heating is performed as radiation heating or in a nip between two heating rollers, wherein a thickness and a degree of inflation of the plastic product are adjusted by adjusting the nip distance and distance traveled by the second film on the heating rollers.

7. The process as defined in claim 1, wherein the reduced pressure applied to the film is a negative pressure.

8. A process for manufacturing a foamed plastic film, comprising the steps of:
   pressurizing a prefoamed plastic film with gas under positive pressure causing the gas to diffuse into the film to form a pressurized plastic film, the film being prefoamed into a degree of foaming of about 30%,
   wherein the film that is being pressurized is a lamellar lens-like or cavitated biaxially oriented polymer film with lamellar structural boundary layers,
   inflating the pressurized plastic film by heating the film at a temperature below a melting point of the film and under a reduced pressure, thereby forming an inflated foamed film obtaining a foaming degree up to 80% and allowing the thickness of the plastic film to be increased without increasing the amount of the plastic material.

* * * * *

UNITED STATES PATENT AND TRADEMARK OFFICE
CERTIFICATE OF CORRECTION

PATENT NO. : 5,955,014
DATED : September 21, 1999
INVENTOR(S) : Raukola, et al.

It is certified that error appears in the above-identified patent and that said Letters Patent is hereby corrected as shown below:

On the title page, Item [73] Assignee, delete, "VTT Technology Oy" and insert
-- Valtion Teknillinen Tutkimuskeskus --.

Signed and Sealed this

Nineteenth Day of September, 2000

Attest:

Q. TODD DICKINSON

Attesting Officer

Director of Patents and Trademarks